United States Patent [19]

Peruglia et al.

[11] 3,749,125

[45] July 31, 1973

[54] SOLENOID-ACTUATED PNEUMATIC ACTUATOR FOR ANTI-SKID VEHICLE BRAKING SYSTEMS

[75] Inventors: Marco Peruglia; Giovanni Anselmino, both of Turin, Italy

[73] Assignee: Flat Societa per Azioni, Turin, Italy

[22] Filed: July 27, 1971

[21] Appl. No.: 166,485

[30] Foreign Application Priority Data

Feb. 26, 1971 Italy.......................... 67679A/71

[52] U.S. Cl. .......... 137/596.16, 251/61.3, 303/21 F
[51] Int. Cl. ............................. G60t 8/12, B60t 8/02
[58] Field of Search.................. 137/596.16, 596.17, 137/596; 303/21 F; 251/61.3

[56] References Cited
UNITED STATES PATENTS 3,550,966   11/1968   Leiber............................... 303/21 F Primary Examiner—Henry T. Klinksiek
Assistant Examiner—Robert J. Miller
Attorney—Richard C. Sughrue et al.

[57] ABSTRACT

This invention relates to an electropneumatic control device arranged to be connected in a pneumatic brake control system responsive to electrical signals from a wheel acceleration sensor. The device includes two solenoid valves, both of which are energized when a brake release signal is received from the wheel sensor: one solenoid valve is normally open to allow bidirectional flow therethrough between a pressure inlet and a delivery port and the second solenoid valve is normally closed, permitting unidirectional flow from the delivery port to a discharge port when open. When an incipient skid is detected and both solenoid valves are energized, compressed air is discharged through the second valve via a controlled discharge device, causing initially a sharp small fall in brake pressure followed by a gradual fall, until normal braking is restored.

5 Claims, 4 Drawing Figures

INVENTORS
MARCO PERUGLIA
GIOVANNI ANSELMINO
BY Sughrue, Rothwell, Mion Zinn & Macpeak
ATTORNEYS

SOLENOID-ACTUATED PNEUMATIC ACTUATOR FOR ANTI-SKID VEHICLE BRAKING SYSTEMS

BACKGROUND OF THE INVENTION

This invention concerns an electropneumatic control device for controlling the variation of a pneumatic pressure with time, particularly suitable for controlling brake pressure modulation in pneumatic anti-skid vehicular braking systems.

Anti-skid braking systems as previously known generally include a control system which supplies control signals to operate or release a brake actuator group, in dependence upon the sensed dynamic conditions of one or more of the vehicle wheels.

A disadvantage of such known anti-skid braking systems is the rapid and excessive variation of the braking pressure applied to the brake actuators during the brake operating and brake release phases of each anti-skid braking cycle. This causes juddering of the vehicle during braking and deterioration in the overall braking efficiency, with possibly dangerous repercussions in the steering characteristics of the vehicle.

Another disadvantage, which arises particularly at the moment braking is initiated, is the difficulty of adapting the mechanically operating parts of the braking system to the conditions imposed by the electrical control circuits, which are generally dependent upon signals derived from electronic devices, and which, therefore, have a fairly high repetition frequency. The voltage impulses which are applied to the brake actuators or their control elements, for example, electrically controlled valves do not cause immediate response in the mechanical parts of the system which, due to their inertia, cannot be pre-disposed to respond to a succession of command signals having a frequency greater than a given response threshold frequency.

It is therefore advisable to limit both the variation of braking pressure during the aforesaid braking and brake-release phases of anti-skid braking, and the rate of such variation, with a view to achieving smooth braking which does not have the disadvantages previously mentioned.

Two previous Italian patent applications of the applicants, serial numbers 67109-A/70 and 71335-A/70 describe anti-skid braking systems having two modes of operation, suitable respectively for braking upon a slippery surface and upon a dry surface, discrimination between the two modes being based on a threshold of discrimination of the braking pressure at which the anti-skid system intervenes.

In the above-mentioned anti-skid brake systems the jump in pressure at the moment of release of braking is not conditional upon the actual braking pressure reached, and is contained within limits such as to minimize the disadvantages referred to above. These systems do not, however, avoid the disadvantage constituted by the rapidity of the braking pressure rise, which does not produce a correspondingly fast response on the part of the braking members.

On the other hand, for braking under normal non-skid conditions of the wheel it is desirable that the brake pressure should increase, if desired, at a pre-determined rate without interference.

An object of this invention is to provide an electropneumatic control device capable of ensuring a sufficiently long period for an increase of brake pressure as to improve the response of the mechanical braking members, thereby resisting the tendency for the vehicle to judder.

Another object of the invention is to allow the brake pressure to increase at a steady fast rate in the absence of any intervention by an anti-skid control system.

A further object of the invention is to provide a control device which does not have calibrated springs and which, therefore, ensures fast and precise operation, independent of plastic or other distortions.

SUMMARY OF THE INVENTION

According to the invention there is provided an electropneumatic control device for use in vehicular anti-skid braking systems, having an inlet port adapted to be connected to a source of pneumatic pressure, a delivery port adapted to be connected to an operating cylinder and a discharge port adapted to be connected to discharge means, the control device including in combination:

a. a first two-way position solenoid valve, normally open, having a chamber between the inlet port and the delivery port, a device in the chamber arranged normally to allow flow of fluid therethrough in both directions and to intercept the flow through the chamber upon excitation of the solenoid of the said first valve, and a floating obturator having on opposite faces respective sealing elements of different areas so arranged that the axial position of the obturator in said chamber is determined by the relative pressures on the two sealing elements, one of which cooperates with a mobile annular seat and the other of which cooperates with a fixed annular valve seat, the obturator permitting flow of fluid from the inlet port to the delivery port by way of a first passage in a first position of the obturator and by way of a second passage in a second position of the obturator, and b. a second two-way, two-position solenoid valve, normally closed, arranged when open to permit unidirectional flow of fluid from the delivery port to the discharge port.

BRIEF DESCRIPTION OF THE DRAWINGS

The invention will be more clearly understood from the detailed description which follows, given by way of non-limiting example, with reference to the accompanying drawings, in which.

DESCRIPTION OF THE ILLUSTRATED EMBODIMENTS

Figure 1:
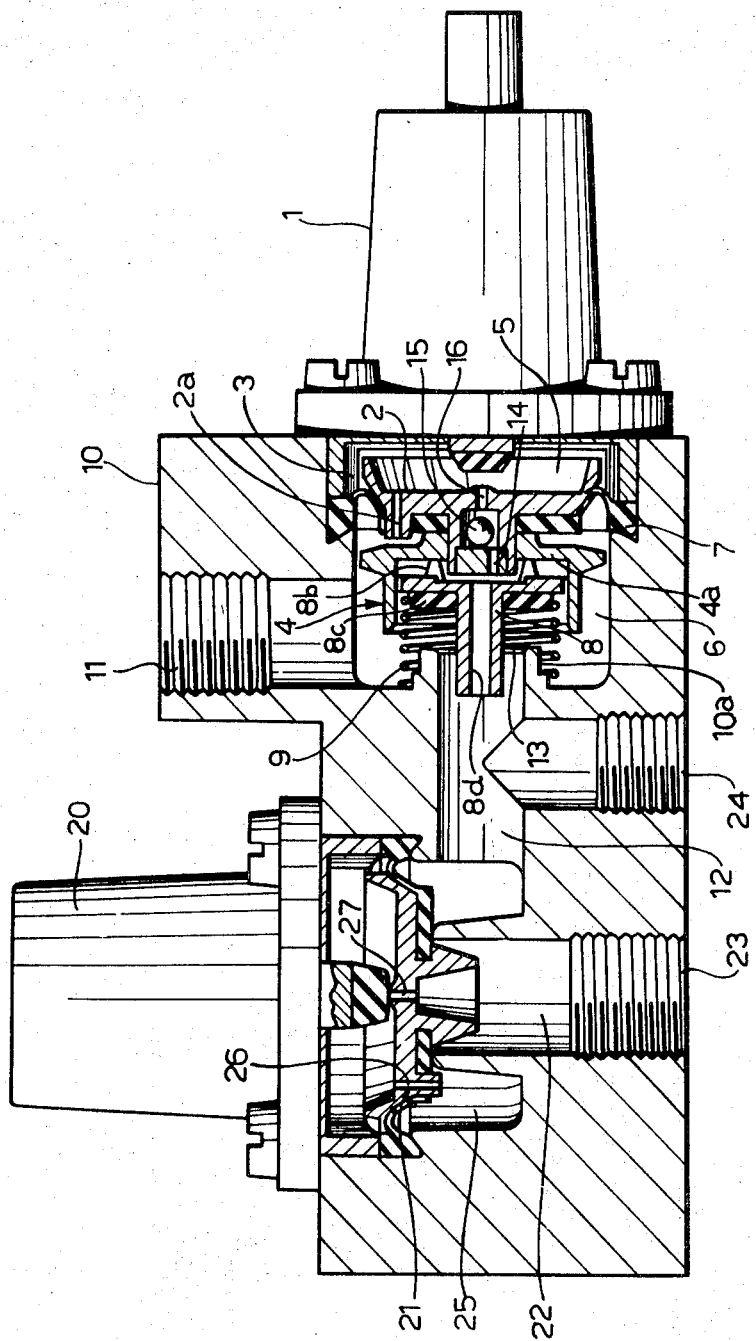
FIG. 1 is a diagrammatic sectional view of an electropneumatic control device according to a preferred embodiment of the invention.

In FIG. 1 reference numeral 1 indicates the operating solenoid of a normally open two-position first solenoid valve comprising a first piston 2 free to move axially within a cylinder 3 formed in a body 10 of the control device. The piston 2 is movable towards the left of FIG. 1 by the movement of a core 40 of the solenoid 1 furnished with a ferrule 42 of elastic material such as rubber which bears against the piston 2. Integral with the piston 2 is a piston 4 which with the piston 2 defines two chambers 5 and 6 in the cylinder 3, separated from each other by an elastic sealing diaphragm 7, the two chambers 5 and 6 communicating with each other via a passage 2a in the piston 2. The axial position of the piston 2 and 4 is determined by the solenoid 1 and by the pressure prevailing in the chamber 6. An inlet port 11 communicates with the chamber 6.

An obturator 8, coaxial with the pistons 2 and 4, is free to move axially within a coaxial skirt portion formed integrally with the piston 4, the position of the obturator 8 being dependent solely upon the position of the piston 2 and the pressure in the chamber 6. A weak spring 9 acts on the obturator 8, urging it lightly towards the piston 4, the spring 9 serving solely to position the obturator 8.

The obturator 8 is provided on its opposite faces with two resilient sealing elements 8b, 8c adapted to seal respectively against different respective areas defined by a face 4a of the piston 4 and an annular wall 10a formed in the body 10. The body 10 is formed with an internal duct 12 which opens into the chamber 6 by way of an opening 13 surrounded by the wall 10a, which acts as a fixed annular valve seat.

The obturator 8 has an axial bore 8d which puts the inlet port 11 in the body 10 into communication with the internal duct 12 when the obturator 8 is sealed against the wall 10a.

The piston 2 is provided with a central axially extending chamber in which a movable ball of polytetrafluoroethylene or other similar material is lodged, this chamber communicating with the chamber 5 by way of a central passage 16 in the piston 2 of larger cross-section than the passage 2a, and with the space within the annular sealing element 8b of the obturator 8 by way of an eccentrically positioned hole 14.

A second, normally closed, two-way, two-position solenoid valve is mounted on the body 10 and has an operating solenoid 20 and a piston 21 the position of which is determined by the solenoid 20 and by the pressure prevailing in an internal chamber 25 in the body 10 communicating with the duct 12 and an internal chamber 22 communicating with a discharge port 23. The piston 21 has a central hole 27 communicating with the chamber 22 and a hole 26 of smaller area communicating with the chamber 25.

Figure 2:
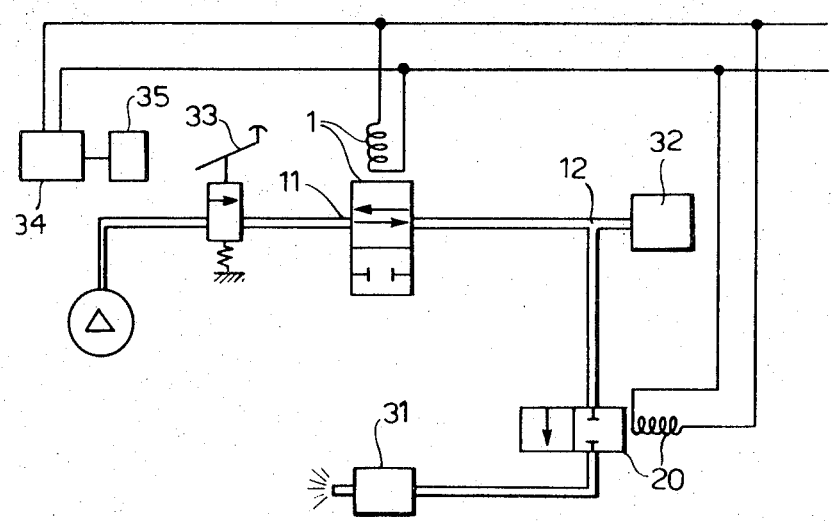
FIG. 2 shows diagrammatically an anti-skid braking system incorporating the control device of FIG. 1.

The inlet port 11 of the first solenoid valve is adapted to be connected to a fluid pressure source 30 (see FIG. 2) by way of a normally closed brake pedal-operated valve 33. The first and second solenoid valves have a common delivery port 24 which forms a branch connection to the duct 12 and which is normally connected to a brake cylinder 32. The discharge port 23 of the second solenoid valve is connected (FIG. 2) to a controlled discharge 31.

An electronic control system 34 (FIG. 2) is responsive to electrical signals provided by a sensing element 35 connected to a wheel or wheels (not shown) of the vehicle. These electrical signals are representative of the acceleration of the respective wheel and when a wheel skid is about to begin, characterized by the commencement of an abrupt wheel deceleration, the control system 34 provides an electrical brake-release signal which is utilized to energize simultaneously the two solenoids 1 and 20 of the respective first and second solenoid valves.

OPERATION

Under normal conditions of operation fluid under pressure (compressed air) is supplied to the inlet port 11 from the source 30 as soon as the brake pedal is depressed to open the valve 33. The compressed air enters the chamber 6 of the first, normally open, solenoid valve and passes through the opening 13, the duct 12 and the delivery port 24 to the brake cylinder 32, operating the wheel brakes.

During braking, and in the absence of intervention on the part of the anti-skid control device 34 to release the brakes, compressed air returns via its supply path, the first solenoid valve permitting bidirectional flow by virtue of the fact that the air under pressure passes through the bore 8d and the hole 14 and acts upon the ball 15, causing the latter to close the passage 16. This in turn causes the piston 2 and hence the piston 4 to leave open the passage between the inlet port 11 and the delivery port 24. If the ball 15 were not present the returning air would flow through the central passage 16, and, by virtue of the large area of the latter relative to the area of the passage 2a, the piston 2 would be moved against the wall 10a cutting off communication between the inlet port 11 and the delivery port 24.

When an incipient skid is sensed by the sensing element 35 the control system 34, as described previously, energizes the two solenoids 1 and 20 simultaneously. Air under pressure then flows from the brake cylinder 32, through the delivery port 24 and the duct 12 and into the chamber 25 of the second solenoid valve, the opening 13 being closed by the piston 4 of the first solenoid valve. With the solenoid 20 energized the second solenoid valve is open and remains under the influence of the pressure in the chambers 25 and 22, as a result of the difference in area of the holes 26 and 27 in the piston 21. Compressed air is therefore discharged through the discharge port 23 and the controlled discharge device 31.

Figure 3:
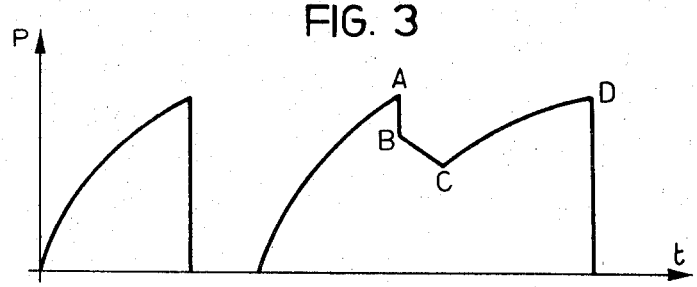
FIG. 3 shows graphically the variation of the pressure supplied to the brake cylinders as a function of time, in use of the differential control device.
Figure 4:
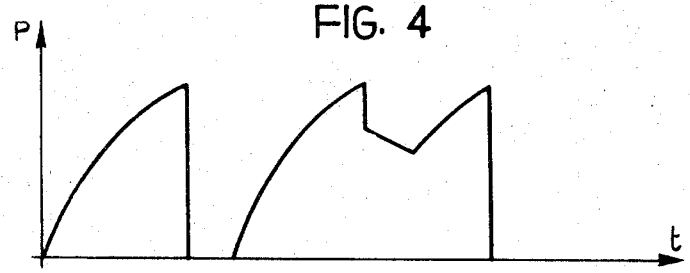
FIG. 4 shows graphically the variation of the pressure supplied to the brake cylinders using a normal solenoid electropneumatic valve as a control device.

The brake pressure undergoes a sharp initial fall A-B (FIG. 3) by a small predetermined amount followed by a gradual decrease B-C, controlled by the discharge device 31, until the sensing element 35 again detects normal wheel running and causes the control system 35 to de-energize the solenoids 1 and 20. Compressed air is then supplied from the inlet port 11 to the delivery port 24 and thence to the brake cylinder 32. The compressed air is, however, obliged to pass through the bore 8d since the obturator 8 remains sealed against the wall 10a, closing the opening 13, by virtue of the different areas of the obturator 8 subjected to the inlet pressure, the central part of the face seated upon the wall 10a being cut off from the inlet pressure. The brake pressure therefore increases gradually (C-D, FIG. 3) and more slowly that it would in the absence of the throttling action of the bore 8d, achieving the desired time lag in the reapplication of full brake pressure when the anti-skid control system 34 will again intervene if skid-producing conditions prevail. The more rapid recovery of brake pressure using a conventional solenoid valve is shown, for comparison, in FIG. 4.

It will be appreciated that practical embodiments of this invention may differ widely from that described and illustrated without going beyond the scope of this invention.

We claim:

1. In a control device, for use in a vehicular anti-skid braking system, having an inlet port adapted to be connected to a source of pneumatic pressure and communicable with a delivery port adapted to be connected to an operating cylinder of a vehicle brake and operating means for interrupting communication between said inlet and delivery ports, the improvement comprising in combination:

wall means defining a chamber between the inlet port and the delivery port and a valve seat surrounding an opening in said chamber leading to said delivery port, a floating obturator disposed in said chamber for movement towards and away from said valve seat and having one face thereof engageable with said valve seat and an opposite face continually subjected to the pressure at the inlet port, means defining a first passage through said obturator between said faces, said obturator permitting flow of fluid through said first passage in a first position of said obturator when said obturator is engaged with said valve seat and by way of a second passage between said obturator and said valve seat in a second position of said obturator when said obturator is removed from said valve seat, and first valve means for selectively closing said first flow passage and moving said obturator to said first position.

2. In a device as set forth in claim 1 further comprising a discharge port disposed in communication with said delivery port, second valve means normally closing said discharge port and means for opening said second valve means to permit unidirectional flow of fluid from the delivery port to said discharge port.

3. In a device as set forth in claim 1 further comprising spring means normally biasing said obturator to said second position.

4. In a device as set forth in claim 1, further comprising solenoid means for operating said first valve means to a position closing said first flow passage and moving said obturator to said first position to close said second passage.

5. A vehicle braking system comprising a control device having an inlet port, a delivery port and a discharge port, a source of pneumatic fluid under pressure connected to said inlet port, operator control means for controlling the flow of fluid under pressure from said source to said inlet port, an operating cylinder of a wheel brake connected to said delivery port, said control device comprising wall means defining a chamber between said inlet port and said delivery port and a valve seat surrounding an opening in said chamber leading to said delivery port, a floating obturator disposed in said chamber for movement toward and away from said valve seat and having one face disposed for engagement with said valve seat and an opposite face continually subject to the pressure of said inlet port, means defining a first passage through said obturator between said faces, said obturator permitting flow of fluid through said first passage in a first position of said obturator when said obturator is engaged with said valve seat and by way of a second passage between said obturator and said valve seat in a second position of said obturator when said obturator is removed from said valve seat, first solenoid operated valve means for closing said first flow passage and moving said obturator to said first position, said discharge port being disposed in communication with said delivery port, second solenoid operated valve means normally closing said discharge port and an anti-skid control means operative to energize said solenoid operated valve means when an incipient skid is detected by said anti-skid control means to close said first and second passages and to open said discharge port.

* * * * *